June 14, 1960  J. G. KNAPP  2,940,800
SWIVEL SOCKET CONNECTION
Filed May 31, 1956
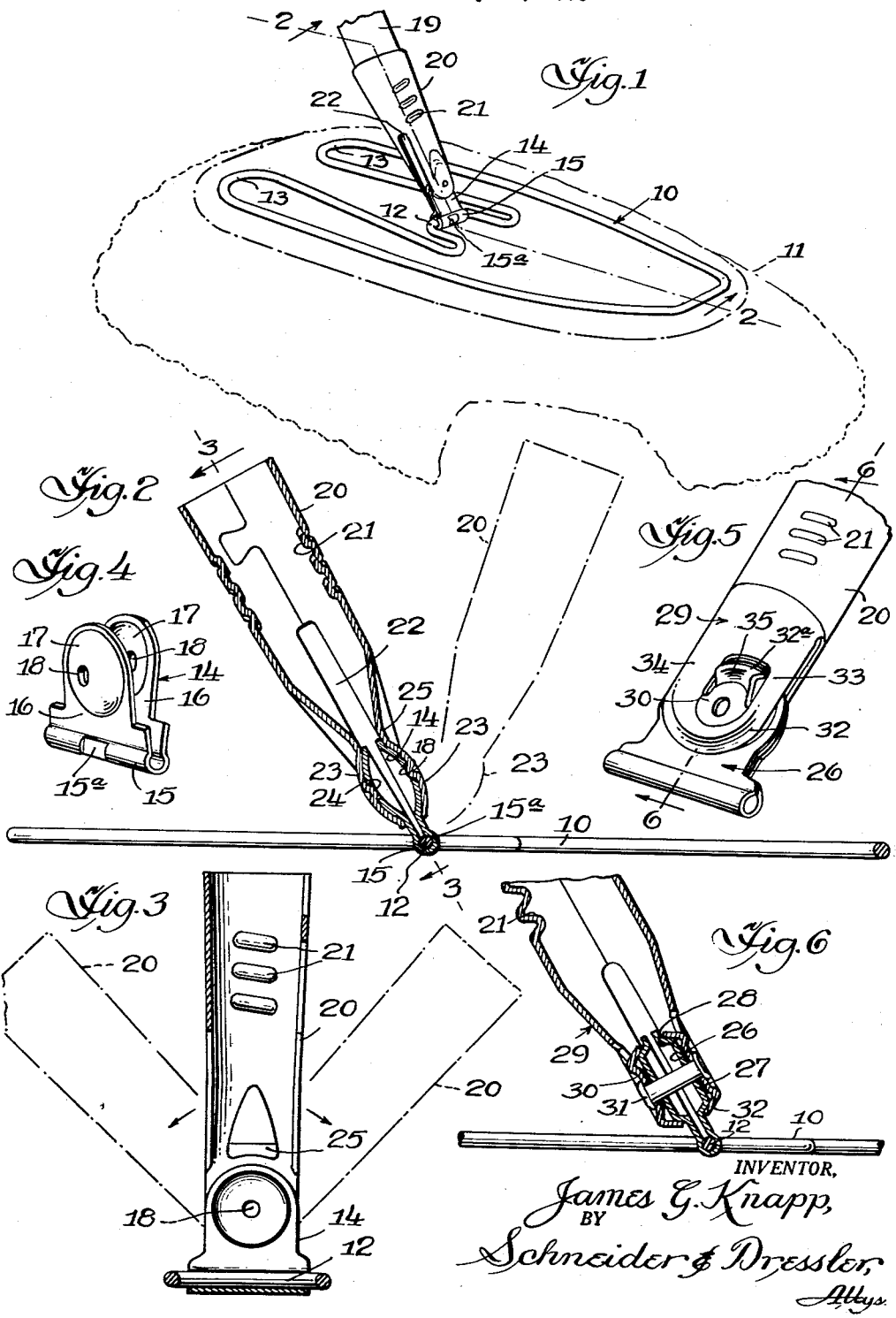
INVENTOR.
James G. Knapp,
BY
Schneider & Dressler
Attys.

United States Patent Office 2,940,800
Patented June 14, 1960

2,940,800
SWIVEL SOCKET CONNECTION

James G. Knapp, Wheaton, Ill., assignor to American-Marietta Company, a corporation of Illinois Filed May 31, 1956, Ser. No. 588,480

4 Claims. (Cl. 306—11)

This invention relates to a swivel socket connection, and is particularly useful when employed as a swivel socket connection for mops.

In the operation of mops or other cleaning or polishing devices, it is often desirable to move the mop body, which may be elongated, first in a longitudinal direction and then in a direction in which the length of the mop body is utilized to provide a wide sweeping action. While a connection providing such a compound movement can be provided, it is found that the multiple pivot connections give a rather loose or lost-motion connection which makes it difficult for the operator to accurately and easily control the movement of the mop body. Even if the connection about one of the pivots is tightened, it is found that the tight connection gives way under use, and before long the same loose structural connection above referred to obtains.

Furthermore, in connecting multiple pivot pins within a mop socket structure, assembly is difficult because of the need for rivets or other securing devices, thus resulting in an expensive assembly operation.

An object of the present invention is to provide a swivel connection between the handle and the mop, etc. frame, which not only provides movement in different directions, but also maintains a relatively stiff connection about at least one of the pivots so that the resulting connection between the handle and the frame is firm, permitting accurate manipulation of the mop body. A further object is to provide a universal movement connection between the handle and the mop, etc., frame without the use of rivets or other connecting means requiring the use of tools, but utilizing the socket portions themselves as an effective means for uniting the mop and handle parts. A still further object is to provide swivel socket connections which maintain a relatively constant friction, whereby the socket portions about one pivot are frictionally held against movement and require deliberate pressure for effective movement thereabout, while at the same time maintaining the desired friction over extended periods of operation. Yet another object is to provide a swivel socket connection between a handle member and a frame member in which the parts can be attached by a simple assembly operation while providing about at least one pivot a relatively constant frictional pressure whereby the mop, etc. can be operated in the usual manner with a minimum of looseness, while, at the same time, however, permitting the handle to be moved deliberately to a different position and against the force of the friction when the broad side of the mop is to be advanced. Other specific objects and advantages will appear as the specification proceeds.

The invention is shown, in an illustrative embodiment, by the accompanying drawing, in which—

Figure 1 is a perspective view of a mop frame connected to a handle by means of a socket connection embodying my invention; Fig. 2, a sectional detail view, the section being taken as indicated at line 2—2 of Fig. 1; Fig. 3, a sectional detail view, the section being taken as indicated at line 3—3 of Fig. 2; Fig. 4, a perspective view of the inner socket member employed in the swivel connection; Fig. 5, a perspective view of a modified form of the invention; and Fig. 6, a sectional detail view, the section being taken as indicated at line 6—6 of Fig. 5.

In the illustration given in Figs. 1 to 4, inclusive, 10 designates a mop frame formed of wire, plastic, or any suitable material, and the same may be anchored by means of fabric, or the like, to a mop body indicated in dotted lines by the numeral 11. The mop body 11 is illustrated as a narrow elongated body. For normal operation, the mop body may be moved forward and backward in the direction of its longitudinal axis, but there are times when it is desired to move the mop body 11 in a direction at right angles to its length, thus utilizing the broad side of the mop body in a sweeping action. It is, therefore, desirable to provide a swivel socket fitting which will enable both of these movements to be effectively carried out, while at the same time overcoming the objection of looseness or instability which prevents accurate manipulation of the mop body.

In the illustration given, the frame 10 is provided with a central pivot portion 12 which extends between the heel portions 13.

Engaging the central pivot 12 is an inner socket member 14, which comprises a generally U-shaped member having at its lower end a tubular portion 15 adapted to receive the pivot portion 12 of frame 10. For additional friction between tubular portion 15 and pivot portion 12, a part of the former may be pressed inward, as at 15a, to bear more tightly against the latter member.

Inner socket member 14 has diverging arms 16, each being provided with an outwardly-dished or pressed semispherical portion 17. The semispherical portion 17 is apertured centrally at 18. The member 14 is preferably formed of highly resilient metal which will tend to maintain the shape shown in Fig. 4. A steel member treated to maintain such resiliency may be employed, or special metals having high resiliency may be used.

The mop handle 19 is preferably connected to a socket 20, which may be provided with thread indentations 21 for engaging threads within the handle 19, and the socket is slotted near its lower end at 22 to receive the inner socket 14. A pair of downwardly extending arms of the socket member 20 on either side of the slots 22 are preferably formed to provide outwardly-dished or semispherical members 23 snugly receiving the semispherical faces 17 of the inner socket 14. The central portion of each face 23 is preferably indented or pressed inward to form pivot points or pins 24 engaging the recesses 18 of the inner socket 14.

It will be understood that both the inner socket and outer socket will conveniently be preformed and then in the assembly operation simply pressed together to form the operative connection shown in Fig. 2. In the forming of the outer socket 20, I prefer to stamp each arm adjacent the semispherical face 23 to form the depression 25, as illustrated best in Figs. 2 and 3, since this pressing action is effective in completing the semispherical shape of each of the faces 23.

In the structure shown in Figs. 1 through 4, it will be noted that the double swivel connection thus provided is accomplished without the use of pivot pins extending through any of the socket.

Operation

In the operation of the structure, the handle 19 may be fixed to the outer socket 20 and the inner socket 14 may be pressed about the frame section 12 to secure it thereto. The spring member 14 may then be compressed to bring the upper portions thereof within the slot 22 of the outer socket, and the parts may then be pressed together to bring the dished portions 17 into engagement with the portions 23 and the pin indentations 24 into engagement with the openings 18. If desired, indentations 24 may be punched out altogether to provide holes in which a shear pin or rivet may be positioned, as in the embodiment of Figs. 5 and 6 described below. In such case, the telescoping semispherical portions may be brought into engagement first, and a locking of the parts then accomplished by insertion and securing in place of the shear pin or rivet. The sequence of steps may be varied, but under each of the operations it is found that an extremely quick assembly can be made simply by producing the frictional engagement between the parts as above described to provide an interlocking connection which is quite stiff with respect to the upper pivot provided by the indentations 24 or their counterpart in the form of a shear pin or rivet.

The expanding faces 17 bear against and cooperate with the dished portions 23 of the outer socket to maintain a uniform frictional engagement between the parts so that, while the mop handle 19 may swing freely upon the common pivot 12 (as indicated in dotted lines on Fig. 2), it requires a deliberate action on the part of the mop user to swing the mop handle to the lateral positions indicated in dotted lines in Fig. 3. At the same time, the stiffness provided about the frictional engagement just described enables the mop to be used in its normal position, as illustrated in Figs. 1 and 2, with a minimum of looseness, and the operator has in effect a rigid mop handle having apparently but one pivot connection with the mop frame. In the swinging of the mop handle laterally about the pivot indentations 24, it is found that the indentations themselves in effect form pivot pins about which the convex socket portions rotate, and such pivots produce a concentric rotation of the bearing surfaces, with a resultant uniform braking effect that requires deliberate bending action on the part of the user.

Not only does the new swivel socket connection permit ready assembly to be made by moving the parts simply into frictional engagement, but also the structure permits disassembly of the parts so that a new frame with its mop body can be secured to the inner socket member 14 and thereby to the outer socket 20 and the handle 19.

Both the inner socket member 14 and the outer socket member 20 may be formed of spring metal and their resiliency utilized in providing frictional engagement between the socket members. If desired, however, both of these members may be made of nonresilient or non-spring steel. Further, if desired, a drop of oil, wax, or other lubricant in very minute quantity may be employed between the socket members to reduce the friction if the same becomes excessive. I have found that the spring tension provided by the inner socket may be sufficient to provide the desired friction, but spring tension can also be effectively provided by the outer socket 20 when this is formed of spring metal. Whether or not spring metal is employed in the making of these parts, I have found that the addition of a minute amount of lubricant is very desirable in bringing about successful operation of the swivel socket structure.

In the modification illustrated in Figs. 5 and 6, the inner socket member 26 has a relatively flat outer surface 27 and arms 28 in the shape of a frustum of a cone. The outer socket member 29 is pressed to provide a straight flat surface 30 adapted to rest near or against the flat portion 27 of the inner socket member 26 and has a central aperture to receive rivet 31, which also passes through a central recess in the inner socket plate 27.

The sides of the outer socket member are struck downwardly to provide arms 32 in the shape of a frustum of a cone, frictionally engaging the cone walls 28 of the inner socket member 26. The cone-shaped outer rim 32 of the outer socket 29 is interrupted at 33 and 34 to provide connecting bands between the main body of the socket member 29 and the central portion 30. Between the bands 33 and 34 on opposite sides of the outer socket member 29, a segment 35 is struck from the body adjacent the flat portion 30. As seen best in Fig. 5, the outer portion of the segment 35 is turned down to provide a cone-shaped arm 32a conforming in shape to the outer cone-shaped arm 32. Thus there is provided mating cone-shaped arms 28, 32 and 32a which provide a limited frictional engagement between the inner and outer socket members providing substantial, but not excessive, frictional engagement between the socket members. In operation, the structure is substantially the same as that described heretofore in connection with Figs. 1 to 4, inclusive.

While, in the foregoing specification, I have set forth a specific structure in considerable detail for the purpose of illustrating one embodiment of the invention, it will be understood that such details of structure may be varied widely by those skilled in the art without departing from the spirit of my invention.

I claim:

1. A swivel connector for attaching a handle to a body which comprises: a pivot member secured to said body; a lower socket member having a looped end portion receiving said pivot member and having a pair of upwardly extending spaced apart arms formed of spring material, said arms being normally biased outwardly away from each other, the upper ends of said arms having a dish shape; an upper socket having an end portion adapted to receive a handle and having a pair of downwardly extending arms receiving said outwardly biased arms of said lower socket member, the arms of said upper socket being dished to conform to and frictionally engage the dished arms of the lower socket member for at least a portion of the periphery thereof; and means for maintaining the dished arms of said upper and lower socket members in alignment with each other.

2. A swivel connector for attaching a handle to a body which comprises: a pivot member secured to said body; a lower socket member having a looped end portion receiving said pivot member and having a pair of upwardly extending spaced apart arms formed of spring material, said arms being normally biased outwardly away from each other, the upper ends of said arms having a dish shape; an upper socket having an end portion adapted to receive a handle and having a pair of downwardly extending arms receiving said outwardly biased arms of said lower socket member, the side arms of said upper socket being dished to conform to and frictionally engage the dished arms of the lower socket member for at least a portion of the periphery thereof; and complementary protuberances and recesses carried by the dished arms of said upper and lower socket members to maintain the same in alignment with each other.

3. A swivel connector for attaching a handle to a body which comprises: a pivot member secured to said body; a lower socket member having a looped end portion receiving said pivot member and having a pair of upwardly extending spaced apart arms formed of spring material, said arms being normally biased outwardly away from each other, the upper ends of said arms having a dish shape with a hole at the center thereof; an upper socket having an end portion adapted to receive a handle and having a pair of downwardly extending arms receiving said outwardly biased side arms of said lower socket member, the arms of said upper socket being dished to conform to and frictionally engage the dished arms of the lower socket member for at least a portion of the periphery thereof and having holes corresponding to the holes in the arms of the lower socket member; and a pin passing through said holes in the dished arms of the upper and lower socket members to maintain the same in alignment with each other.

4. A swivel connector for attaching a handle to a body which comprises: a pivot member secured to said body; a lower socket member having a looped end portion receiving said pivot member and pressed thereagainst in rotatable, frictional engagement and having a pair of upwardly extending spaced apart arms formed of spring material, said arms being normally biased outwardly away from each other, the upper ends of said arms having a dish shape; an upper socket having an end portion adapted to receive a handle and having a pair of downwardly extending arms receiving said outwardly biased arms of said lower socket member, the arms of said upper socket being dished to conform to and frictionally engage the dished arms of the lower socket member for at least a portion of the periphery thereof; and means for maintaining the dished arms of said upper and lower socket members in alignment with each other.

References Cited in the file of this patent

UNITED STATES PATENTS

| | | |
|---|---|---|
| 982,597 | Habig | Jan. 24, 1911 |
| 1,453,745 | Cabana | May 1, 1923 |
| 1,586,979 | Dugdill | June 1, 1926 |
| 1,735,278 | Hertzberg | Nov. 12, 1929 |
| 1,997,685 | Hertzberg | Apr. 16, 1935 |
| 1,998,634 | Oberti | Apr. 23, 1935 |
| 2,050,762 | Preisser et al. | Aug. 11, 1936 |
| 2,164,398 | Glover | July 4, 1939 |
| 2,581,141 | Raptis | Jan. 1, 1952 |

FOREIGN PATENTS

| | | |
|---|---|---|
| 1,099,025 | France | Mar. 16, 1955 |

OTHER REFERENCES

"Every-Which-Way Mops," publication, O Cedar Corp., W-1 price list, April 1955. (Copy in Division 27.)